US007760239B2

United States Patent
Kim et al.

(10) Patent No.: US 7,760,239 B2
(45) Date of Patent: Jul. 20, 2010

(54) DIGITAL BROADCASTING RECEPTION APPARATUS FOR SIMULTANEOUSLY CAPTURING CAMERA IMAGE AND DIGITAL BROADCASTING IMAGE AND METHOD FOR THE SAME

(75) Inventors: Yong Min Kim, Gumi-si (KR); Jae Gon Son, Daegu Metropolitan (KR); Kang Wook Kim, Daegu Metropolitan (KR)

(73) Assignee: Samsung Electronics Co., Ltd (KR)

( * ) Notice: Subject to any disclaimer, the term of this patent is extended or adjusted under 35 U.S.C. 154(b) by 532 days.

(21) Appl. No.: 11/715,511

(22) Filed: Mar. 8, 2007

(65) Prior Publication Data

US 2007/0222863 A1 Sep. 27, 2007

(30) Foreign Application Priority Data

Mar. 22, 2006 (KR) .............. 10-2006-0026049

(51) Int. Cl.
*H04N 5/232* (2006.01)
(52) U.S. Cl. .............. 348/211.99; 348/14.01; 348/333.02
(58) Field of Classification Search .......... 348/211.1, 348/211.12, 333.01, 333.05, 333.11, 239, 348/565, 584, 14.01, 14.07; 725/61
See application file for complete search history.

(56) References Cited

U.S. PATENT DOCUMENTS

| 7,250,983 | B2* | 7/2007 | Lin et al. ............. 348/584 |
| 2002/0140860 | A1* | 10/2002 | Ozaki et al. ............. 348/565 |
| 2006/0114363 | A1* | 6/2006 | Kang et al. ............. 348/838 |

FOREIGN PATENT DOCUMENTS

| CN | 1791199 | 6/2006 |
| KR | 1020050091125 | 9/2005 |
| KR | 100651592 | 11/2006 |
| KR | 1020070048470 | 5/2007 |

* cited by examiner

*Primary Examiner*—Gevell Selby
(74) *Attorney, Agent, or Firm*—The Farrell Law Firm, LLP

(57) ABSTRACT

Disclosed is a digital broadcasting reception apparatus for simultaneously capturing a camera image and a digital broadcasting image and a method thereof. The digital broadcasting reception apparatus includes a digital broadcasting reception unit for receiving digital broadcasting data, an image collection unit for collecting images under external control, a collected image processing unit for displaying the collected image with a camera preview screen, an image combination unit for combing the digital broadcasting data with the camera preview screen, and a display unit for displaying a combined result from the image combination unit and a DMB image and a camera image through a multiple-layered overlay structure.

15 Claims, 8 Drawing Sheets

DIGITAL BROADCASTING RECEPTION APPARATUS FOR SIMULTANEOUSLY CAPTURING CAMERA IMAGE AND DIGITAL BROADCASTING IMAGE AND METHOD FOR THE SAME

PRIORITY

This application claims priority under 35 U.S.C. §119 to an application entitled "Digital Broadcasting Receiver And Method For Simultaneously Capturing Video Of Camera And Video Of Broadcasting" filed in the Korean Intellectual Property Office on Mar. 22, 2006 and assigned Serial No. 2006-0026049, the contents of which is incorporated herein by reference.

BACKGROUND OF THE INVENTION

1. Field of the Invention

The present invention relates generally to a digital broadcasting reception apparatus and, more particularly, to a digital broadcasting reception apparatus for simultaneously capturing a camera image and a digital broadcasting image in the digital broadcasting reception apparatus having a camera function and a method thereof.

2. Description of the Related Art

Conventionally, the term "DMB" refers to a Digital Multimedia Broadcast service that digitally provides various types of multimedia signals, such as voice and image signals. More particularly, DMB refers to a broadcasting service that allows a user to receive various types of multimedia broadcastings even in motion through a personal portable receiver or a vehicle receiver which is equipped with through an omnidirectional reception antenna.

With the development of mobile communication technology and the wide-spread use of mobile communication terminals, the mobile communication terminals can now support various functions (for example, a SMS transmission or an image transmission function) in addition to a telephone function. Therefore, as the use of the mobile communication terminals has increased, reliance upon these terminals has also increased.

Currently, mobile communication terminals equipped with a camera (for example, digital camera or camera phone) and mobile communication terminals capable of receiving DMB data (i.e., a so called DMB phone) have become popular, and mobile communication terminals having both of these functions (i.e., the camera and DMB reception function) have also become commercially available.

Although a user may desire to simultaneously capture a picture and a desired DMB image, there is conventionally no apparatus and method for simultaneously performing a camera function and a digital broadcasting function and simultaneously capturing a camera image and a DMB image.

FIG. 1 is a schematic block diagram illustrating a conventional digital broadcasting reception apparatus. With reference to FIG. 1, a digital broadcasting reception apparatus having a camera function is shown. Referring The digital broadcasting reception apparatus 10 includes a DMB reception unit 11 for receiving DMB data, a DMB image processing unit 12 for processing the DMB image data, an image collection unit 13 for collecting camera images, a collected image processing unit 14 for processing the camera image, and a image selection unit for selecting one of the DMB image and the camera image and outputting it to a display unit 16 under control of a control unit 18. In this case, the control unit 18 controls the image selection unit 15 so as to select one of the DMB image and the camera image based on the user input through a manipulation signal input unit 17 (i.e., an input unit such as a keypad, etc.)

As described above, in the case of a conventional digital broadcasting reception apparatus having a camera function, only a single DMB image or camera image can be only selected and displayed at one time. As a result, it is impossible to simultaneously capture the camera image and the DMB image. Accordingly a users' desire to simultaneously capture the camera image and the DMB image cannot be satisfied.

SUMMARY OF THE INVENTION

Accordingly, an object of the present invention is to solve at least the problems and disadvantages of the background art.

It is an object of the present invention to provide a digital broadcasting reception apparatus and method for simultaneously capturing a camera image and a DMB image.

Furthermore, an object of the present invention is to provide apparatus and method for a user to conveniently combining various types of images using a digital broadcasting reception apparatus having a camera function.

In order to accomplish the above objects, a digital broadcasting reception apparatus according to the present invention includes a digital broadcasting reception unit for receiving digital broadcasting data, an image collection unit including a camera lens for collecting images captured by the camera lens, a collected image processing unit for displaying the collected image with a camera preview screen, an image combination unit for combing the digital broadcasting data with the camera preview screen, and a display unit for displaying a combined result from the image combination unit.

The image combination unit preferably overlays the camera preview screen upon the digital broadcasting data when the camera preview screen is requested during output of the digital broadcasting data, and can change a display location and shape of the camera preview screen based on information selected by a user.

Alternatively, the image combination unit can overlay the digital broadcasting data upon the camera preview screen when the digital broadcasting data is requested during output of the camera preview screen, and can change a display location and shape of the camera preview screen based on information selected by a user.

Preferably, the digital broadcasting reception apparatus further includes a control unit for capturing a combined image displayed on the display unit, based on a screen capture request command of a user, and a captured image storage unit for storing the captured image.

Preferably, the control unit simultaneously captures the digital broadcasting data and the camera preview screen from a screen on which the digital broadcasting data and the camera preview screen are overlaid.

In order to accomplish the above and other objects and objectives, the present invention provides, a method for capturing an image in a digital broadcasting reception apparatus, the method including an image collection step for collecting images when a camera preview is requested while the digital broadcasting reception apparatus operates in a digital broadcasting mode, a collected image processing step of displaying the collected image with a camera preview screen, an image combination step for combining the camera preview screen with digital broadcasting data received according to the digital broadcasting mode, a display step for displaying the combined image, and a capture step for capturing the combined image in displayed in the display step based on the screen capture request command of a user.

In this case, preferably, the image combination step is performed by overlaying the camera preview screen upon the digital broadcasting data, and can change a display location and shape of the camera preview screen based on information selected by the user.

Preferably, the capture step simultaneously captures the digital broadcasting data and the camera preview screen from a screen on which the digital broadcasting data and the camera preview screen are overlaid.

It is yet another object of the present invention to provide an apparatus and a method for capturing an image in a digital broadcasting reception apparatus including a digital broadcasting data reception step for receiving digital broadcasting data when digital broadcasting data is requested while the digital broadcasting reception apparatus operates in a camera mode, a camera preview screen display step of the collected image according to the camera mode operations, an image combination step for combining the camera preview screen with the digital broadcasting data, a display step for displaying the combined image, and a capture step for capturing the displayed combined image based on a screen capture request command of a user.

In this case, preferably, the image combination step is performed by overlaying the digital broadcasting data upon the camera preview screen, and can change a display location and shape of the digital broadcasting data based on information selected by the user.

Preferably, the capture step simultaneously captures the digital broadcasting data and the camera preview screen from a screen on which the digital broadcasting data and the camera preview screen are overlaid.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF PREFERRED EMBODIMENTS

Preferred embodiments of the present invention will be described in a more detailed manner with reference to the drawings. Reference will now be made in detail to embodiments of the present invention, examples of which are illustrated in the accompanying drawings.

Figure 1:
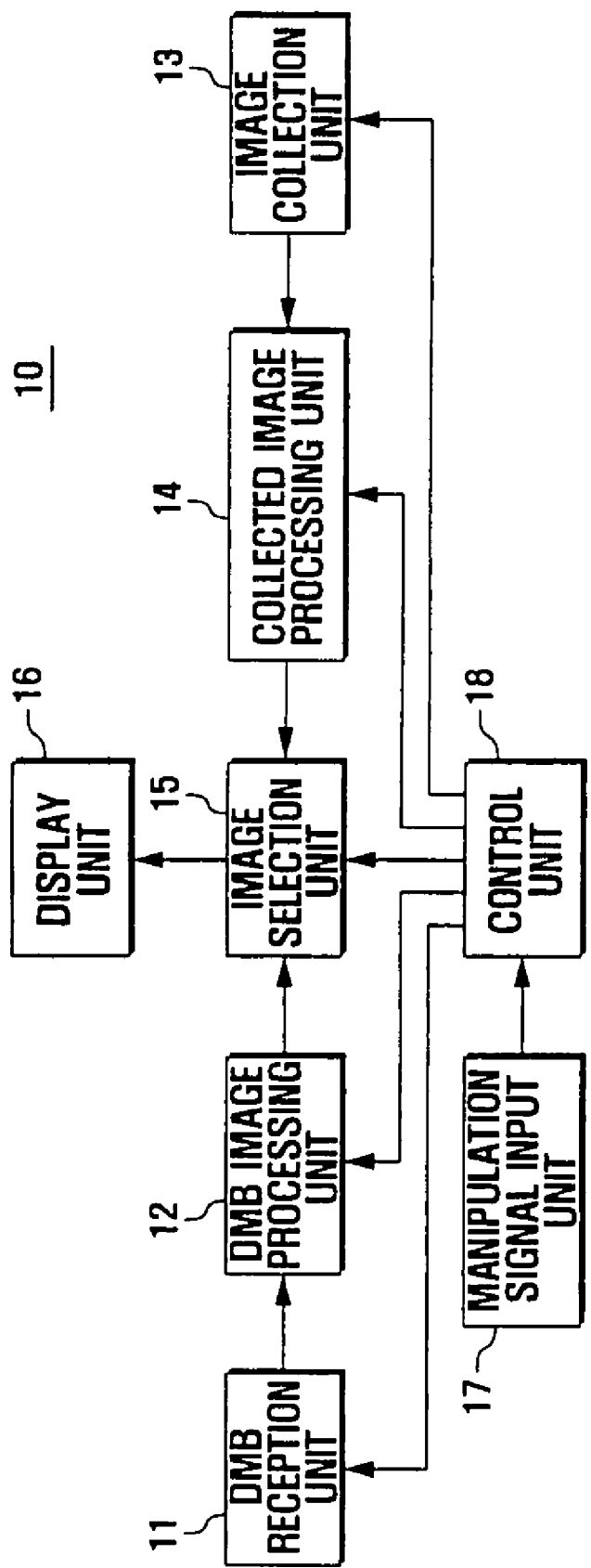
FIG. 1 is a schematic block diagram illustrating a conventional digital broadcasting reception apparatus
Figure 2:
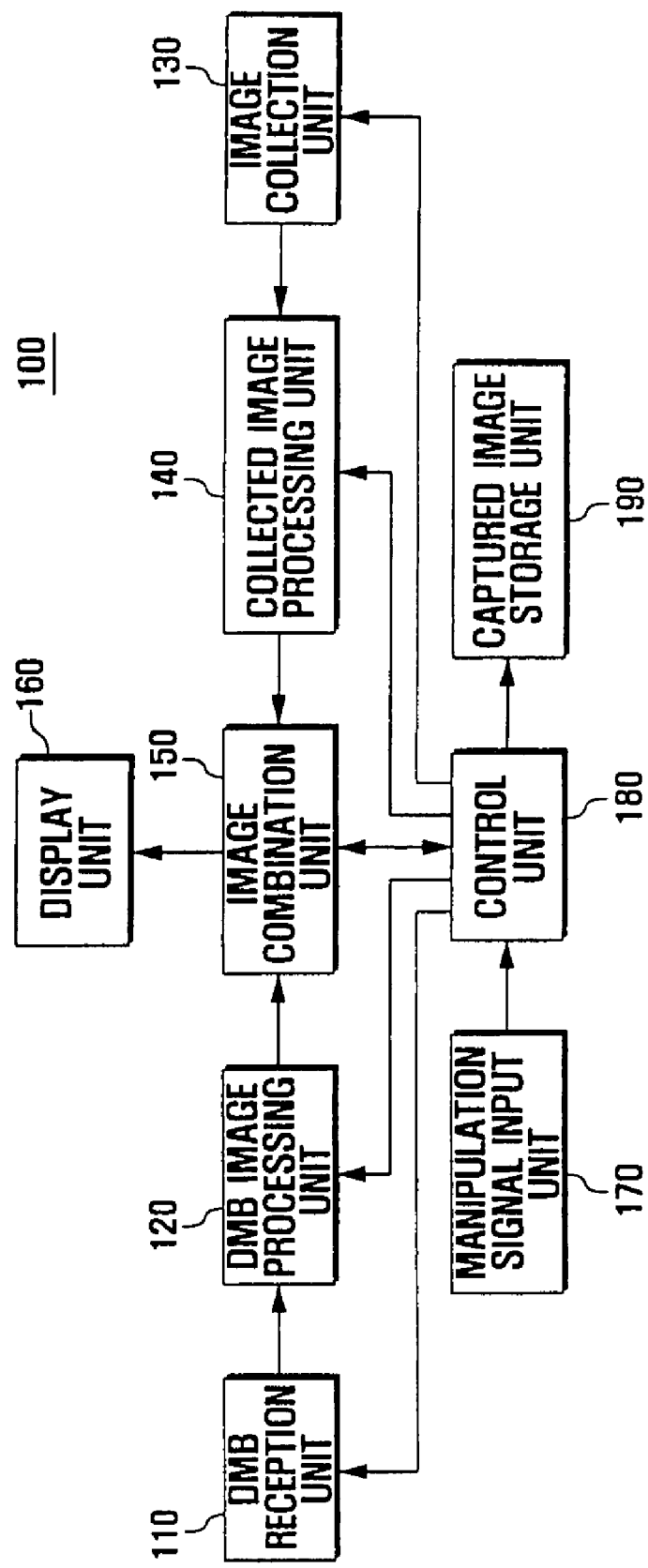
FIG. 2 is a schematic block diagram illustrating a digital broadcasting reception apparatus according to a first embodiment of the present invention.

FIG. 2 is a schematic block diagram illustrating a digital broadcasting receiver having a camera function according to the present invention. In particular, FIG. 2 is a schematic block diagram illustrating a digital broadcasting receiver having a camera function. Referring to FIG. 2, the digital broadcasting receiver 100 according to the embodiment of the present invention includes a DMB reception unit 110, a DMB image processing unit 120, an image collection unit 130, a collected image processing unit 140, an image combination unit 150, a display unit 160, a manipulation signal input unit 170 (e.g., a keypad, etc.), a control unit 180, and a captured image storage unit 190.

The DMB reception unit 110 receives DMB data under the control of the control unit 180. For example, the DMB reception unit 110 receives a broadcasting channel, which is selected by a user, from the control unit 180, selects a Code Division Multiplexing (CDM) channel corresponding to the broadcasting channel, and receives DMB data through the selected channel. For this, it is preferable that the DMB reception unit 110 includes an omni-directional antenna (not shown).

The DMB image processing unit 120 processes data received from the DMB reception unit 110. For example, the DMB image processing unit 120 extracts MPEG-4 data from broadcasting data delivered in a MPEG-2 Transport Stream (TS) format, and decodes and outputs digital video data. For this, it is preferred that the DMB data processing unit 120 includes a TS demultiplexer, a video buffer and a video CODEC (coder-decoder). Furthermore, the DMB image processing unit 120 converts DMB image into RGB signals and outputs them.

The image collection unit 130 collects information about images captured by the camera lens. For example, the image collection unit 130 collects image information in response to a manipulation signal (i.e., a signal corresponding to a user's request) through the manipulation signal input unit 170. For this, the image collection unit 130 preferably includes a camera lens and an image capturing device such as a charge coupled device (CCD) (both of which are not shown).

The collected image processing unit 140 processes the image collected by the image collection unit 130 and converts the collected signal into a desired format for display. Additionally, the collected image processing unit 140 performs a process of displaying the collected image on the display unit 160 and can generate a preview screen for determining whether to capture of the collected image.

At this time, the collected image processing unit 140 converts the image collected in a YUV (luminance/chrominance) format into corresponding RGB signals and outputs them.

The image combination unit 150 combines the DMB images delivered through the DMB image processing unit 120 with the camera image delivered through the collected image processing unit 140. That is, the image combination unit 150 combines the RGB signals delivered through the DMB image processing unit 120 and the collected image processing unit 140. Accordingly, it is preferable that the image combination unit 150 operates under the control of the controller 180. In particular, the image combination unit 150 preferably combines two images so as to simultaneously output the DMB image and the camera image using a camera overlay function. Furthermore, the image combination unit 150 can overlay the DMB image on the camera image (or vice versa), thereby combing the two images. An example of the case in which the DMB image is overlaid on the camera image is illustrated in FIG. 5B. As a result, a specific example for overlay will be described with reference to FIG. 5B.

Furthermore, it is preferable that the image combination unit 150 changes the overlaid image display location and shape based on information selected by the user. For example, the image combination unit 150 changes the display location and shape of the camera image in the case that the camera image is overlaid on the DMB image. When the DMB image is overlaid on the camera image, it is preferable that the image combination unit 150 changes the display location and shape of the DMB image.

The display unit 160 displays an image combined by the image combination unit 150. That is, the DMB image or the camera image is overlaid upon each other and displayed.

The manipulation signal input unit 170 provides a user interface. In particular, the manipulation signal input unit 170 receives a user's manipulation signal corresponding to a user's key entry, etc., for controlling the digital broadcasting reception device 100, and delivers the received signal to the control unit 180.

The control unit 180 controls the overall operation of the digital broadcasting reception device 100 based on the user's manipulation signal input through the manipulation signal input unit 170 or a previously stored control algorithm. In particular, when the simultaneous outputting and capturing of the DMB image and the camera image are requested through the manipulation signal input unit 170, the control unit 180 checks a current operation mode and then controls the image combination unit 150 and the other units as necessary so as to combine an image corresponding to the current operation mode with another image. For example, when a camera preview screen is requested during a DMB mode, the image combination unit 150 is controlled so as to combine two images by overlaying the camera preview screen upon the DMB image. Furthermore, when DMB is requested during a camera mode, the image combination unit 150 is controlled so as to combine two images by overlaying the DMB image on the camera preview screen.

Furthermore, when a capture request command is input when simultaneously outputting the camera image and the DMB image, the control unit 180 receives information about the two images being simultaneously output from the image combination unit 150, captures the output image, and stores the captured image in the captured image storage unit 190.

The captured image storage unit 190 stores the DMB image, the camera image, and a capture result for the combined image of the DMB image and the camera image. The captured image storage unit can include a memory such as a flash memory, a harddrive, a ROM/RAM, etc.

Figure 3:
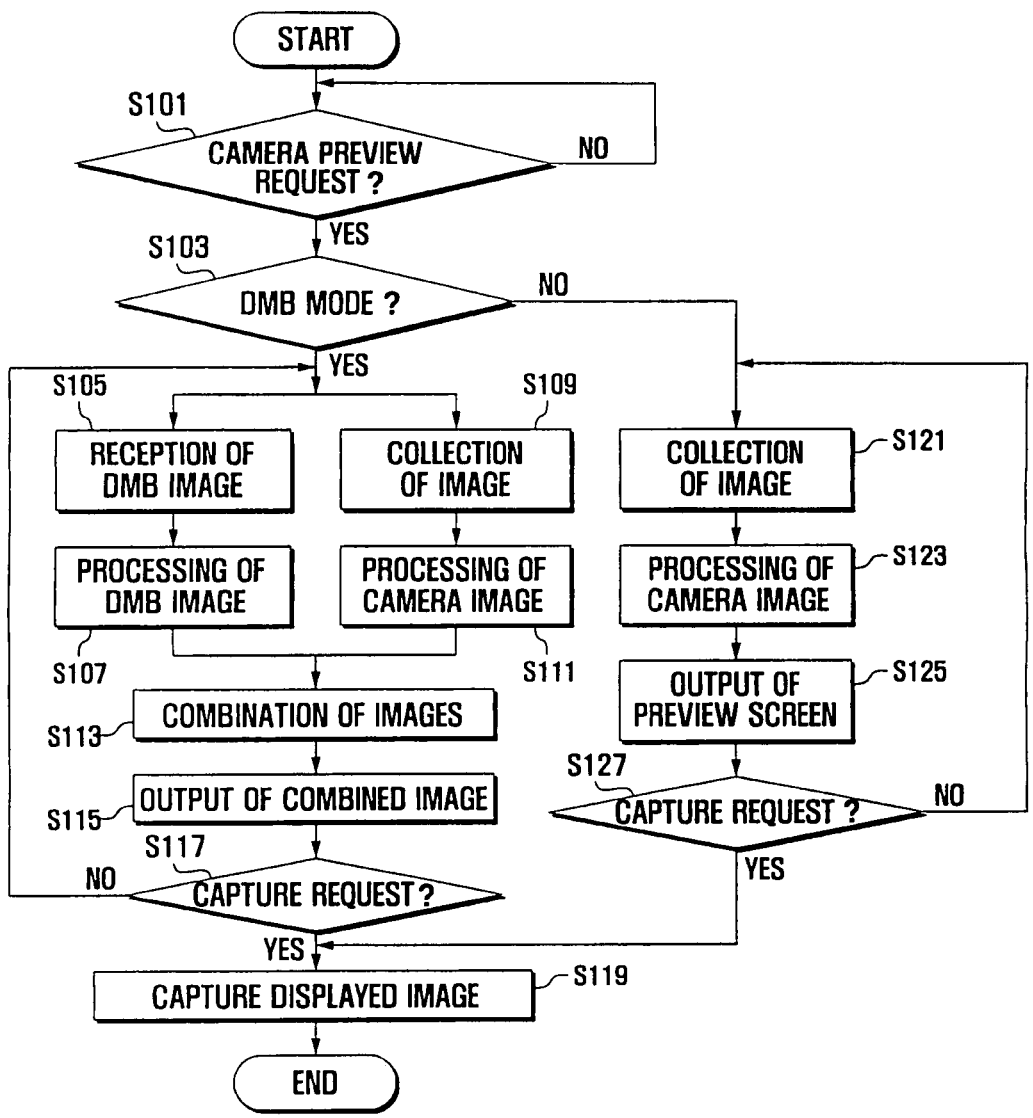
FIG. 3 is a flowchart illustrating a method of simultaneously capturing a camera image and a digital broadcasting image according to the first embodiment of the present invention.

FIG. 3 is a flowchart illustrating a method of simultaneously capturing a camera image and a digital broadcasting image according to the present invention. In particular, FIG. 3 illustrates an example of a method of combining a camera image with a DMB image and output the combined image when a camera preview is requested during a DMB mode, and simultaneously capturing the DMB image and the camera image in response to the capture request for the combined image in the digital broadcasting reception apparatus.

Referring to FIGS. 2 and 3, the method of simultaneously capturing the camera image and the digital broadcasting image according to the present invention is described as follows.

First, when the camera preview is requested through the manipulation signal input unit 170 in step S101, the control unit 180 determines whether the digital broadcasting reception apparatus 100 operates in a DMB mode in step S103. If, it is determined in step 103 that the digital broadcasting reception apparatus 100 is operating in the DMB mode, the control unit 180 controls the DMB reception unit 110, the DMB image processing unit 120, the image collection unit 130, and the collected image processing unit 140 so as to collect image information through a camera while maintaining the DMB mode. That is, the control unit 180 receives the DMB image through the DMB reception unit 110 in step S105, and controls the DMB image processing unit 120 so as to process the received DMB image in step S107. Meanwhile, the control unit 180 collects an image through the image collection unit 130 in step S109, and controls the collected image processing unit 140 so as to process the collected camera image in step S111.

In this case, in step S107, MPEG-4 data is detected from the broadcasting data delivered in a MPEG-2 TS (Transport Stream), and digital video data are decoded and output. Furthermore, in step S107, the DMB image is converted into corresponding RGB signals.

Meanwhile, in step S111, the preview screen for determination of whether to capture a collected image is generated. Furthermore, in step S111, the image collected in YUV format is converted into corresponding RGB signals. Conversion routines for converting YUV format signals to corresponding RGB format signals are known in the art and not discussed here.

Furthermore, the image combination unit 150 combines the DMB image and the camera images, which have been converted into RGB corresponds signals at steps S107 and S111, in step S113 and delivers the combined image to the display unit 160. Then, the display unit 160 outputs the combined image in step S115.

In this case, in step S113, it is preferred that the DMB image and the camera image be combined using a overlay function during outputting of the DMB image such that the two images are simultaneously output.

Furthermore, in step 113, the display location and shape of the camera image are changeable based on information selected by the user.

Furthermore, when the capture request command is input in step S117 in the state in which the DMB image and the camera image have been simultaneously output, the control unit 180 receives information about the two simultaneously output images from the image combination unit 150 and captures the output image in step S119. Then, the control unit 180 stores the captured image in the captured image storage unit 190. Meanwhile, if, as the result of performance of step S103, the digital broadcasting reception apparatus 100 is not determined to be operating in the DMB mode, the control unit 180 controls the image collection unit 130 and the collected image processing unit 140 so as to collect an image in step S121 and to process the collected camera image in step S123. Then, the control unit 180 outputs a preview screen in step S125. In this case, a camera image processing function similar to that of step S111 is performed in step S123. Furthermore, only the camera preview screen is displayed on the display unit 160.

In the state in which the camera preview screen has been displayed, when the capture request command is input in step S227, the control unit 180 captures the displayed image displaying (i.e., the camera preview screen) in step S119.

Figure 4:
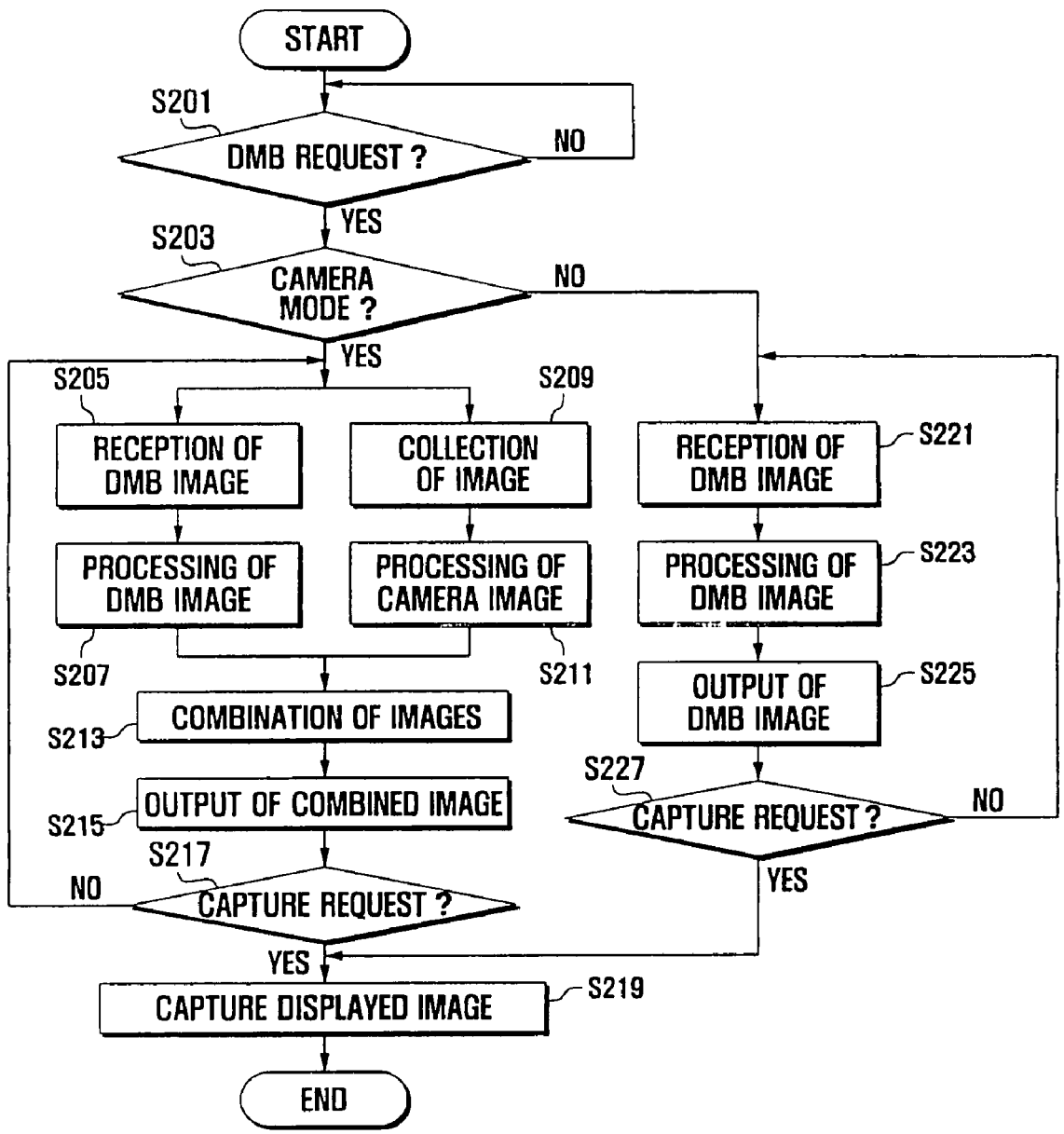
FIG. 4 is a flowchart illustrating a method of simultaneously capturing a camera image and a digital broadcasting image according to the second embodiment of the present invention.

FIG. 4 is a flowchart illustrating the method of simultaneously capturing a camera image and a digital broadcasting image according to the present invention. In particular, FIG. 4 illustrates a flowchart illustrating a method of combining a DMB image with a camera preview screen when a digital broadcasting reception apparatus receives a DMB request while operating in a camera mode, outputting the combined image, and simultaneously capturing a camera image and a digital broadcasting image in response to a capture request for the output image.

Referring to FIGS. 2 and 4, the method of simultaneously capturing the camera image and the digital broadcasting image according to the present invention is described below.

First, when DMB is requested through the manipulation signal input unit 170 in step S201, the control unit 180 determines whether the digital broadcasting reception apparatus 100 operates in a camera mode in step S203. If, it is determined that, the digital broadcasting reception apparatus 100 operates in the camera mode, the control unit 180 controls the DMB reception unit 110, the DMB image processing unit 120, the image collection unit 130 and the collected image processing unit 140 so as to output the DMB image in the state in which a camera preview screen has been displayed. That is, the DMB reception unit 110 is controlled so as to receive the DMB image in step S205, and the DMB image processing unit 120 is controlled so as to process the received DMB image in step S207. Furthermore, the image collection unit 130 is controlled to collect an image in step S209, and the collected image processing unit 140 is controlled so as to process the collected camera image in step S211.

In this case, in step S207, MPEG-4 data is detected from the broadcasting data delivered in a MPEG-2 TS, and digital video data is decoded and output. Furthermore, in step S207, the DMB image is converted into corresponding RGB signals. In step S211, the preview screen for the determination of whether to capture the collected image is generated. Furthermore, in step S211, the image collected in YUV format is converted into corresponding RGB signals.

The image combination unit 150 combines the DMB image, and the camera image, both of which have been converted into RGB signals at steps S207 and S211, in step S213, and delivers the combined image to the display unit 160. Then, the display unit 160 outputs the combined image in step S215.

In this case, it is preferred that the DMB image be overlaid upon the camera image (i.e., the camera preview screen), thereby combining the two images. Furthermore, in step 213, the display location and shape of the DMB image are changeable based on information selected by the user.

Furthermore, in the state in which the DMB image and the camera image have been simultaneously output, when the capture request command is input (e.g., by the user, etc.) in step S217, the control unit 180 receives information about the two images which simultaneously output from the image combination unit 150 and captures the output image in step S219. Thereafter, the control unit 180 stores the captured image in the captured image storage unit 190. Meanwhile, if, it is determined in step S203 that the digital broadcasting reception apparatus 100 is not operating in the camera mode, the control unit 180 controls the DMB reception unit 180 and the DMB image processing unit 120 so as to receive the DMB in step S221 and process the received DMB image in step S223. Thereafter, the DMB image is output in step S225. In this case, a camera image processing function which is similar to that of step S207 is performed in step S223. Furthermore, only the DMB image is displayed on the display unit 160.

In the state in which the DMB image has been displayed, when the capture request command is input, the control unit 180 captures a only the displayed DMB image in the displaying of step S219.

Figure 5A:
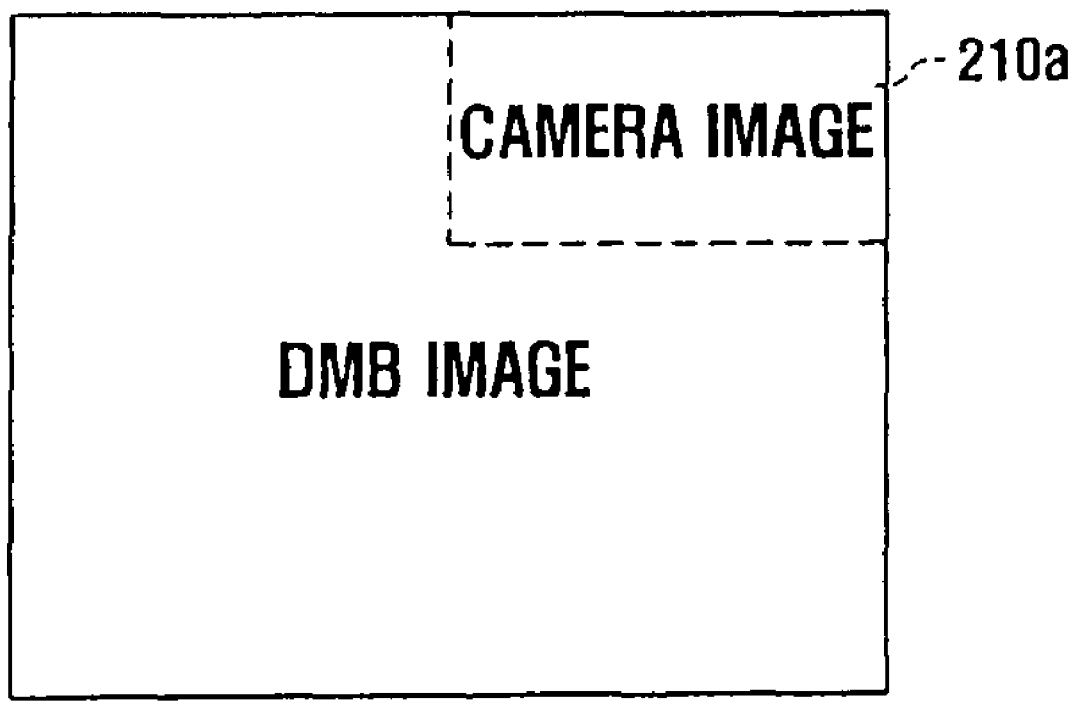
FIGS. 5A to 5C are diagrams illustrating examples in which the camera image and the digital broadcasting image are simultaneously captured according to the first embodiment of the present invention.
Figure 5B:
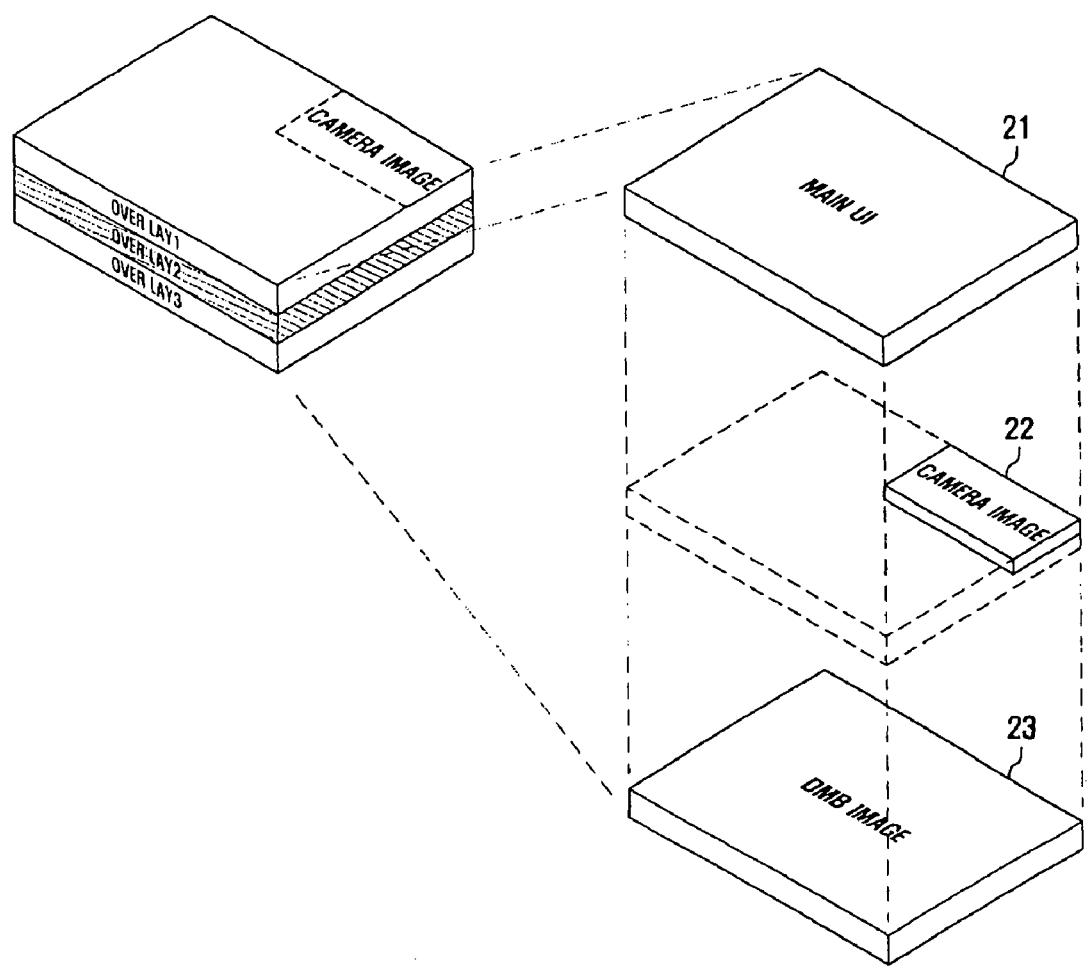
Figure 5C:
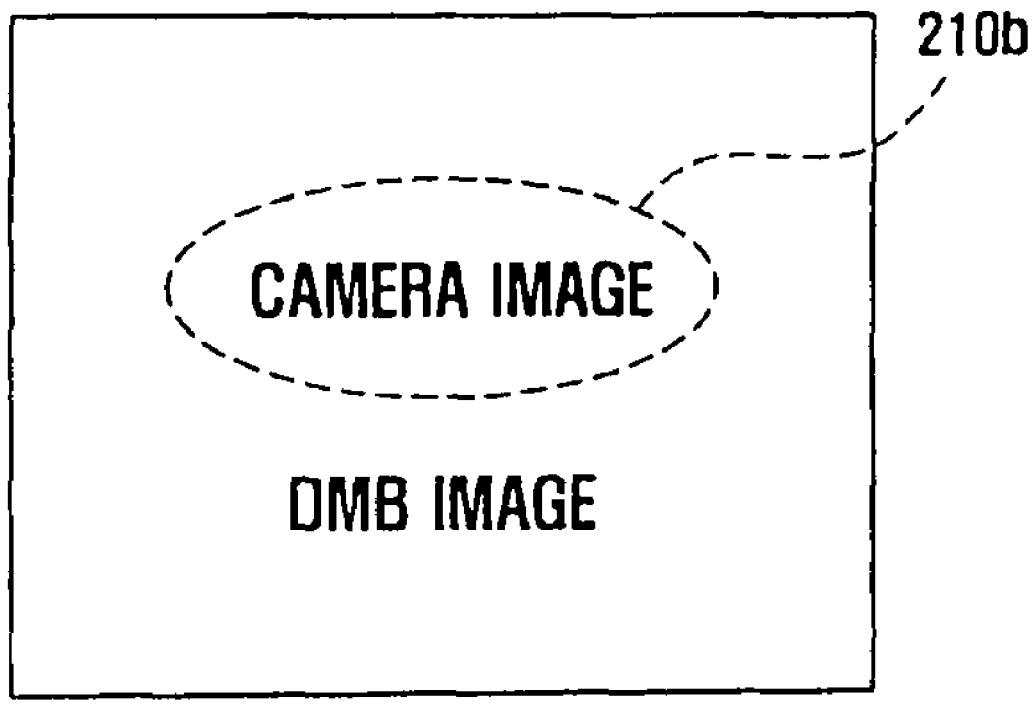

FIGS. 5A to 5C are diagrams illustrating examples in which the camera image and the digital broadcasting image are simultaneously captured according to the present invention. That is, FIGS. 5A to 5C illustrate cases in which the camera image is overlaid on the digital broadcasting image when the digital broadcasting reception apparatus receives a camera preview request while operating in the DMB mode.

FIG. 5A is a diagram illustrating an example of a case in which the camera image 210a is overlaid on a portion (that is, upper portion) of the DMB image in a rectangular shape in the state where the DMB image is displayed on the screen 200a of the digital broadcasting reception apparatus.

FIG. 5B is a diagram illustrating an overlay structure for representing a processing result illustrated in FIG. 5A. That is, FIG. 5B illustrates an example of a case in which the screen 200a of the digital broadcasting reception apparatus is composed of three overlays (that is, overlay-1, overlay-2 and overlay-3 corresponding to 21, 22, 23, respectively). In the example of FIG. 5B, a main User Interface (UI), the camera image, and the DMB image are respectively displayed on the overlay-1 21, the overlay-2 22, and the overlay-3 23.

In this case, the priority of an overlay is determined depending on the transparency of a corresponding image. That is, it is preferred that an image having a higher transparency constitute a higher overlay.

In the example of FIG. 5B, since the camera image is displayed in the right upper portion of the screen in a rectangular shape, a portion corresponding only to the camera image among the overall screen of the overlay 2-22 is activated.

FIG. 5C is an example of a case in which the shape and location of a camera image are changed. That is, referring to FIG. 5C, the camera image 210b is overlaid in an elliptic shape on the center of the screen 200a of the digital broadcasting reception apparatus on which the DMB image is displayed. In the case in which the DMB image or the camera image is overlaid as described above, in the example of FIG. 5B, the construction of the overlay-2 22 is modified. That is, the overlay 2 22 is implemented such that the camera image is arranged on the central portion of the overall screen.

Figure 6A:
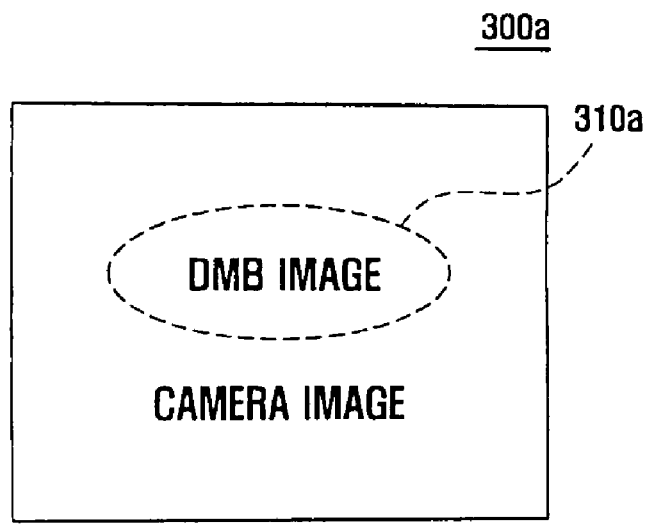
FIGS. 6A and 6B are diagrams illustrating examples in which a camera image and a digital broadcasting image are simultaneously captured according to the second embodiment of the present invention.
Figure 6B:
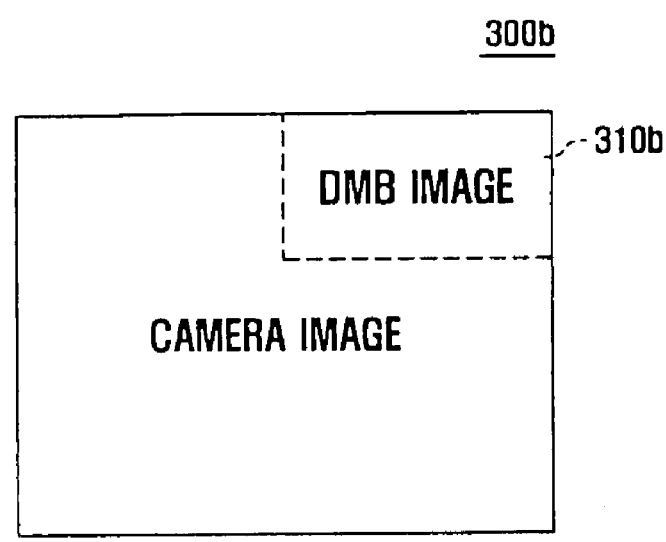

FIGS. 6A and 6B are diagrams illustrating examples in which a camera image and a digital broadcasting image are simultaneously captured according to the present invention. That is, FIGS. 6A and 6B illustrate examples of a case in which a DMB image is overlaid on the camera preview screen when a digital broadcasting reception apparatus receives a DMB request while operating in the camera mode.

FIG. 6A is a diagram illustrating an example of a case in which the DMB image 310a is overlaid on a portion (that is, upper right portion) of the camera image in a rectangular shape in the state in which the camera image (that is, preview screen) is displayed on the screen 300a of the digital broadcasting reception apparatus. In the overlay structure as in FIG. 5B, it is preferred that the camera image be arranged on the overlay-3 and a rectangular shape of DMB image be arranged on the upper right portion of the screen on overlay-2.

FIG. 6B illustrates a case in which the shape and location of a DMB image are changed. Referring to FIG. 6B, the DMB image 310b is overlaid in an elliptic shape on the center of the screen 300b of the digital broadcasting reception apparatus on which the camera image is displayed. In the case in which the DMB image or the camera image is overlaid as described above, in the overlay structure as in FIG. 5B, it is preferred that the camera image be arranged on the overlay-3 and a rectangular shape of DMB image be arranged on the center of the screen of the overlay-2.

As described above, the present invention displays both a DMB image and a camera image through a multiple-layered overlay structure and captures the displayed screen, so that it is possible to capture a DMB image and a camera image simultaneously.

As described above, the present invention simultaneously displays a real-time digital broadcasting image and a camera image on single screen and captures the displayed screen in response to a capture request command in a digital broadcasting reception apparatus having a camera function, so that there is an advantage of simultaneously capturing the digital broadcasting image and the camera image. Therefore, there is an advantage in that users can conveniently combine various types of images using the digital broadcasting reception apparatus of the present invention.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A digital broadcasting reception apparatus, comprising:
    a digital broadcasting reception unit for receiving digital broadcasting data, detecting MPEG-4 (Motion Pictures Expert Group) digital broadcasting data from received MPEG-2 TS (transport stream) digital broadcasting data and converting the detected digital broadcasting data into RGB (Red, Green and Blue) signals;
    an image collection unit for collecting images input thereto, the image collection unit being controlled by an external control means;
    a collected image processing unit for displaying the collected image with a camera preview screen;
    a digital broadcasting data processing unit for pre-processing the received digital broadcasting data and converting the digital broadcasting data into RGB (Red, Green and Blue) signals;
    an image combination unit for combining the digital broadcasting data with the camera preview screen and outputting a corresponding image, and combining the camera preview screen converted into the RGB (Red, Green and Blue) signals with digital broadcast data converted into the RGB (Red, Green and Blue) signals; and
    a display unit for displaying the image output from the image combination unit.

2. The digital broadcasting reception apparatus as set forth in claim 1, wherein the image combination unit overlays the camera preview screen on the digital broadcasting data when the camera preview screen is requested during output of the digital broadcasting data.

3. The digital broadcasting reception apparatus as set forth in claim 2, wherein the image combination unit changes display location and shape of the camera preview screen based on information selected by a user.

4. The digital broadcasting reception apparatus as set forth in claim 1, wherein the image combination unit overlays the digital broadcasting data upon the camera preview screen when the digital broadcasting data is requested during output of the camera preview screen.

5. The digital broadcasting reception apparatus as set forth in claim 4, wherein the image combination unit changes display location and shape of the camera preview screen based on information selected by a user.

6. The digital broadcasting reception apparatus as set forth in claim 1, further comprising:
    a control unit for capturing a displayed combined image displayed on the display unit based on a screen capture request command input by a user; and
    a captured image storage unit for storing the captured image.

7. The digital broadcasting reception apparatus as set forth in claim 6, wherein the control unit simultaneously captures the digital broadcasting data and the camera preview screen from a screen on which the digital broadcasting data and the camera preview screen are overlaid.

8. A method of capturing an image in a digital broadcasting reception apparatus, comprising:
    an image collection step for collecting an image when a camera preview is requested while the digital broadcasting reception apparatus operates in a digital broadcasting mode;
    a collected image processing step for displaying the collected image with a camera preview screen;
    an image combination step for combining the camera preview screen with digital broadcasting data received according to the digital broadcasting mode;
    a display step for displaying the combined image; a capture step for capturing the displayed combined image when a screen capture request is entered by a user;
    a digital broadcasting processing step for detecting MPEG-4 (Motion Pictures Expert Group) digital broadcasting data from received MPEG-2 TS (transport stream) digital broadcasting data and converting the detected digital broadcasting data into RGB (Red, Green and Blue) signals;
    a collected image converting step for converting the collected image into RG B (Red, Green and Blue) signals; and
    the image combination step for combining the camera preview screen converted into the RGB (Red, Green and Blue) signals with digital broadcast data converted into the RGB (Red, Green and Blue) signals.

9. The method as set forth in claim 8, wherein the image combination step includes overlaying the camera preview screen on the digital broadcasting data.

10. The method as set forth in claim 9, wherein the image combination step changes display location and shape of the camera preview screen based on information selected by the user.

11. The method as set forth in claim 8, wherein the capture step simultaneously captures the digital broadcasting data and the camera preview screen from a screen on which the digital broadcasting data and the camera preview screen are overlaid.

12. A method of capturing an image in a digital broadcasting reception apparatus, comprising:
    a digital broadcasting data reception step for receiving digital broadcasting data when a digital broadcasting data is requested while the digital broadcasting reception apparatus operates in a camera mode;
    a camera preview screen display step for displaying the collected image according to the camera mode operation;
    an image combination step for combining the camera preview screen with the digital broadcasting data;
    a display step of displaying the combined image;
    a capture step of capturing the displayed combined image when a screen capture request entered by a user;

a digital broadcasting processing step for detecting MPEG-4 (Motion Pictures Expert Group) digital broadcasting data from received MPEG-2 TS (transport stream) digital broadcasting data and converting the detected digital broadcasting data into RGB (Red, Green and Blue) signals;

a collected image converting step for converting the collected image into RG B (Red, Green and Blue) signals; and the image combination step for combining the camera preview screen converted into the RGB (Red. Green and Blue) signals with digital broadcast data converted into the RGB (Red, Green and Blue) signals.

13. The method as set forth in claim 12, wherein the image combination step includes overlaying the digital broadcasting data on the camera preview screen.

14. The method as set forth in claim 13, wherein the image combination step includes changing a display location and shape of the digital broadcasting data based on information selected by the user.

15. The method as set forth in claim 12, wherein the capture step includes simultaneously capturing the digital broadcasting data and the camera preview screen from a screen on which the digital broadcasting data and the camera preview screen are overlaid.

\* \* \* \* \*